(12) United States Patent
Saito

(10) Patent No.: US 9,199,523 B2
(45) Date of Patent: Dec. 1, 2015

(54) VEHICLE BODY VIBRATION CONTROL DEVICE FOR VEHICLE

(71) Applicant: TOYOTA JIDOSHA KABUSHIKI KAISHA, Toyota-shi, Aichi (JP)

(72) Inventor: Takashi Saito, Fuji (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/554,171

(22) Filed: Nov. 26, 2014

(65) Prior Publication Data

US 2015/0153748 A1 Jun. 4, 2015

(30) Foreign Application Priority Data

Nov. 29, 2013 (JP) ................................. 2013-248607

(51) Int. Cl.
*G05D 19/02* (2006.01)
*B60G 17/018* (2006.01)

(52) U.S. Cl.
CPC ................... *B60G 17/0182* (2013.01)

(58) Field of Classification Search
USPC .......................................................... 701/37
See application file for complete search history.

(56) References Cited

U.S. PATENT DOCUMENTS

| | | | | |
|---|---|---|---|---|
| 5,332,061 A * | 7/1994 | Majeed | ................ | B60K 5/1283 180/312 |
| 5,610,483 A * | 3/1997 | Obara | ..................... | B60L 15/20 318/139 |
| 7,532,951 B2 * | 5/2009 | Sato | ........................ | G05D 19/02 700/170 |
| 7,633,257 B2 * | 12/2009 | Sakamoto | ............. | B60W 10/08 318/611 |
| 7,715,949 B2 * | 5/2010 | Sato | ........................ | F02M 61/14 188/378 |
| 7,904,221 B2 * | 3/2011 | Oikawa | .................. | B60W 30/20 267/140.11 |
| 7,962,261 B2 * | 6/2011 | Bushko | .............. | B60G 17/0157 280/5.507 |
| 8,378,615 B2 * | 2/2013 | Tazawa | ..................... | H02P 6/10 318/560 |
| 8,538,590 B2 * | 9/2013 | Sun | ....................... | B64C 27/001 700/280 |
| 8,560,129 B2 * | 10/2013 | Moriya | ................. | F16F 15/002 700/280 |
| 8,725,351 B1 * | 5/2014 | Selden | ................... | B60N 2/501 267/140.11 |
| 2006/0200287 A1 * | 9/2006 | Parison | ................. | B60N 2/501 701/37 |
| 2007/0005196 A1 | 1/2007 | Oikawa et al. | | |
| 2008/0082235 A1 * | 4/2008 | Nakamura | ......... | B60G 17/0155 701/37 |
| 2012/0185121 A1 * | 7/2012 | Umehara | ................ | B60L 15/20 701/22 |
| 2013/0136270 A1 * | 5/2013 | Sakamoto | .............. | G10K 11/16 381/71.4 |

(Continued)

FOREIGN PATENT DOCUMENTS

JP 03-078542 A 4/1991
JP 05-321728 A 12/1993

(Continued)

*Primary Examiner* — Thomas Tarcza
*Assistant Examiner* — Alex C Dunn
(74) *Attorney, Agent, or Firm* — Sughrue Mion, PLLC

(57) ABSTRACT

Provided is a vehicle body vibration control device (10) for a vehicle, including a request driving force calculation unit (20) calculating a driver's request driving force, a driving unit (16) applying a driving force to the vehicle (12), a driving force control unit (22) controlling the driving unit based on command driving force, and a notch filter (24) receiving a signal indicating the request driving force, processing the signal so as to reduce a frequency component of vibration of a vehicle body, and outputting the processed signal to the driving force control unit as a command driving force signal. The control device (10) further includes a correction unit (30) correcting, when there is no need to correct the command driving force to a value reduced in effect of the filter processing, the notch filter so as to use a current value as data subjected to the filter processing.

4 Claims, 7 Drawing Sheets

(56) References Cited

U.S. PATENT DOCUMENTS

2013/0184935 A1* 7/2013 Muragishi ............... F16F 15/02
 701/37
2014/0032044 A1* 1/2014 Watai ..................... G05D 19/02
 701/36

FOREIGN PATENT DOCUMENTS

| JP | 2007-8421 A | 1/2007 |
| JP | 2007-237879 A | 9/2007 |

* cited by examiner

VEHICLE BODY VIBRATION CONTROL DEVICE FOR VEHICLE

BACKGROUND OF THE INVENTION

1. Field of the Invention

The present invention relates to a vehicle body vibration control device for a vehicle such as an automobile, and more particularly, to a vehicle body vibration control device configured to suppress vibration of a vehicle body, which is caused by fluctuation in driving force of the vehicle.

2. Description of the Related Art

Vehicles such as automobiles travel by a driving force generated by a driving unit such as an engine. Fluctuation in driving force generated from the driving unit causes loads to be applied on the vehicle body in a fore-and-aft direction and a vertical direction of the vehicle relative to wheels. Thus, pitching vibration occurs in the vehicle body. Therefore, it has been suggested that the pitching vibration of the vehicle body be reduced through appropriate control of a command driving force to the driving unit.

For example, Japanese Patent Application Laid-open No. 2007-8421 filed by the applicant of this application describes a vehicle body vibration control device configured based on the above-mentioned concept. This vehicle body vibration control device includes a request driving force calculation unit configured to calculate a driver's request driving force, a driving unit configured to apply a driving force to a vehicle, a driving force control unit configured to control the driving unit based on a command driving force, and a notch filter configured to receive a signal indicating the request driving force from the request driving force calculation unit. The notch filter has a notch frequency set to a value for reducing a frequency component of vibration of a vehicle body. The notch filter subjects the signal to filter processing, and outputs the processed signal to the driving force control unit as a signal indicating the command driving force.

When vehicle traveling control, which is any one of cruise control, brake assist control, and anticollision control, is involved in control of the driving force of the vehicle, damping control based on the command driving force generated through the notch filter processing is not executed. As a result, according to the vehicle body vibration control device of this type, the vehicle body vibration can be reduced by the damping control when the vehicle traveling control is not executed. When the vehicle traveling control is executed, the damping control can be prevented from adversely affecting the vehicle traveling control.

The command driving force in the vehicle such as an automobile is calculated by an electronic control unit such as a microcomputer, and the command driving force is calculated through the notch filter at every predetermined time based on a driver's past request driving force, a current request driving force, and a past command driving force. Accordingly, the driver's request driving force is smoothed through the filter processing, and the command driving force is generated. This causes reduction of responsiveness of increase or decrease of a driving force of a driving source to a change of the request driving force. In a state where the request driving force increases or decreases in stages, a delay of a change of the command driving force with respect to the change of the request driving force is inevitable.

An effect of the damping control based on the command driving force generated through the notch filter processing becomes higher as a notch degree of the filter becomes higher. However, the delay of the change of the command driving force with respect to the change of the request driving force becomes larger as the notch degree becomes higher. The delay of the change of the command driving force with respect to the change of the request driving force is large when the request driving force changes in stages, and becomes larger as a difference in change of the request driving force between stages becomes larger.

When the delay of the change of the command driving force with respect to the change of the request driving force is large, the driver may feel that responsiveness of the driving unit to a driving operation has been reduced, and thus feel uncomfortable.

In the above-mentioned driving force control unit described in Japanese Patent Application Laid-open No. 2007-8421, similarly, the damping control is performed when the vehicle traveling control is not executed. Thus, this driving force control unit cannot prevent the driver from feeling uncomfortable due to feeling that responsiveness of the driving unit has been reduced.

SUMMARY OF THE INVENTION

It is a main object of the present invention to reduce, while suppressing vehicle body vibration as effectively as possible, a possibility of feeling that responsiveness of the driving unit to a driving operation has been reduced even when the request driving force changes in stages.

The present invention, according to one embodiment, provides a vehicle body vibration control device for a vehicle, including: a request driving force calculation unit configured to calculate a request driving force of a driver; a driving unit configured to apply a driving force to a vehicle; a driving force control unit configured to control the driving unit based on a command driving force; and a notch filter configured to receive a signal indicating the request driving force from the request driving force calculation unit, subject the signal to filter processing, and output the signal which has been subjected to the filter processing, to the driving force control unit as a signal indicating the command driving force, the notch filter having a notch frequency set to a value for reducing a frequency component of vibration of a vehicle body. The notch filter calculates the command driving force at every predetermined time interval based on a past request driving force, a current request driving force, and a past command driving force.

The vehicle body vibration control device further includes a determination unit configured to determine whether or not there is a need to correct the command driving force to a value reduced in effect of the filter processing, and a command driving force correction unit configured to correct, when the determination unit determines that there is a need to correct the command driving force, the command driving force to the value reduced in effect of the filter processing. The command driving force correction unit corrects, when the determination unit determines that there is no more need to correct the command driving force, in calculation of a command driving force executed immediately after the determination, the notch filter so as to calculate the command driving force by using the current request driving force in place of the past request driving force and the past command driving force.

According to the above-mentioned configuration, the signal indicating the request driving force is processed by the notch filter having the notch frequency set to the value for reducing the frequency component of the vibration of the vehicle body, and the processed signal is output to the driving force control unit as the signal indicating the command driving force. When it is determined that there is a need to correct the command driving force to the value reduced in effect of the filter processing, the command driving force is corrected to the value reduced in effect of the filter processing.

Accordingly, a smoothing degree of the driver's request driving force during the generation of the command driving force through the filter processing can be reduced. As a result, a delay of a change of the command driving force with respect to a change of the request driving force can be reduced, and a possibility of driver's feeling that responsiveness of the driving unit to a driving operation has been reduced can be reduced.

When it is determined that there is no more need to correct the command driving force, in calculation of the command driving force immediately after the determination, the notch filter is corrected so as to calculate the command driving force by using the current request driving force in place of the past request driving force and the past command driving force.

Thus, even when the request driving force changes in stages, the filter processing can be performed without any influence of the request driving force yet to be changed in stages. Once the command driving force has been calculated by using the current request driving force, the command driving force is set to a value not affected by the request driving force yet to be changed in stages. Subsequent filter processing is accordingly performed without any influence of the request driving force yet to be changed in stages. As a result, even when the request driving force changes in stages, the delay of the change of the command driving force with respect to the change of the request driving force can be prevented from being enlarged, and a possibility of driver's uncomfortable feeling due to feeling that responsiveness of the driving force to the driving operation has been reduced can be reduced.

Further, the present invention, according to another embodiment, provides a vehicle body vibration control device for a vehicle, including: a request driving force calculation unit configured to calculate a request driving force of a driver; a driving unit configured to apply a driving force to the vehicle; a driving force control unit configured to control the driving unit based on a command driving force; and a notch filter configured to receive a signal indicating the request driving force from the request driving force calculation unit, subject the signal to filter processing, and to output the signal, which has been subjected to the filter processing, to the driving force control unit as a signal indicating the command driving force, the notch filter having a notch frequency set to a value for reducing a frequency component of vibration of a vehicle body. The notch filter calculates the command driving force at every predetermined time interval based on a past request driving force, a current request driving force, and a past command driving force.

The vehicle body vibration control device further includes a determination unit configured to determine whether or not there is a need to correct the command driving force to a value reduced in effect of the filter processing, and a command driving force correction unit configured to correct, when the determination unit determines that there is a need to correct the command driving force, the command driving force to the value reduced in effect of the filter processing. The command driving force correction unit corrects, when the determination unit determines that there is a need to correct the command driving force, the notch filter so as to calculate the command driving force by using the current request driving force in place of the past request driving force and the past command driving force.

According to the above-mentioned configuration, the signal indicating the request driving force is processed by the notch filter having the notch frequency set to the value for reducing the frequency component of the vibration of the vehicle body, and the processed signal is output as the signal indicating the command driving force to the driving force control unit. When it is determined that there is a need to correct the command driving force to the value reduced in effect of the filter processing, the command driving force is corrected to the value reduced in effect of the filter processing.

Thus, a smoothing degree of the driver's request driving force during the generation of the command driving force through the filter processing can be reduced. As a result, a delay of a change of the command driving force with respect to a change of the request driving force can be reduced, and a possibility of driver's feeling that responsiveness of the driving unit to a driving operation has been reduced can be reduced.

When it is determined that there is a need to correct the command driving force, in subsequent calculation of the command driving force, the notch filter is corrected so as to calculate the command driving force by using the current request driving force in place of the past request driving force and the past command driving force.

Thus, even when the request driving force changes in stages, as long as it is determined that there is a need to correct the command driving force, the filter processing can be performed without any influence of the request driving force yet to be changed in stages. As a result, even when the request driving force changes in stages, the delay of the change of the command driving force with respect to the change of the request driving force can be prevented from being enlarged, and a possibility of driver's uncomfortable feeling due to feeling that responsiveness of the driving force to the driving operation has been reduced can be reduced.

"Correcting the command driving force to the value reduced in effect of filter processing" may be achieved by "correcting the command driving force to a value closer to the driver's request driving force than to the command driving force", or by "reducing a notch degree of the notch filter". "Correcting the command driving force to the value closer to the driver's request driving force than to the command driving force" is preferred to be achieved by "correcting the command driving force to the driver's request driving force".

Further, according to one embodiment of the present invention, in the above-mentioned configuration, the determination unit may determine, when the driving force applied to the vehicle changes in stages during the correction of the command driving force, that there is no more need to correct the command driving force.

According to the above-mentioned configuration, in a state where the command driving force has been corrected, when the driving force applied to the vehicle changes in stages, in calculation of the command driving force immediately after the change, the notch filter can be corrected. The step change of the driving force applied to the vehicle may be any one of an increased change and a decreased change.

Further, according to one embodiment of the present invention, in the above-mentioned configuration, the determination unit may determine, under a state in which the correction of the command driving force is not executed, that there is a need to correct the command driving force, in any one of cases in which the driving unit applies no driving force to the vehicle and in which driving force limitation control for limiting the driving force applied to the vehicle is executed even when the driver performs an operation to increase the driving force.

According to the above-mentioned configuration, in a state where the driving unit applies no driving force to the vehicle, or where the driving force limitation control for limiting a driving force applied to the vehicle is executed even when the driver performs the operation to increase the driving force, the notch filter can be corrected.

"The state where the driving unit applies no driving force to the vehicle" may be a state where a driving force transmission route from the driving source of the driving unit to driving wheels has been cut off. "The state where the driving force limitation control for limiting the driving force applied to the vehicle is executed even when the driver performs the operation to increase the driving force" may be a state where the driving force applied to the vehicle is limited for the purpose of controlling traveling of the vehicle.

The driving force limitation control may be arbitrary control for limiting the driving force applied to the vehicle for the purpose of controlling traveling of the vehicle. As such driving force limitation control, for example, there are brake override system (BOS) control, drive start control (DSC), and automatic speed limiter (ASL) control. The BOS control is control for preventing the driving force of the vehicle from overriding a braking force of the vehicle under a state where the driver performs both a braking operation and a driving operation. The DSC is control for limiting, in order to prevent the driving force of the vehicle from being excessive when the driver performs a shifting operation, the driving force of the vehicle to be equal to or smaller than the braking force of the vehicle. The ASL control is control for limiting the driving force of the vehicle, in order to prevent a vehicle speed from exceeding a vehicle speed limit set by the driver.

DETAILED DESCRIPTION OF THE PREFERRED EMBODIMENTS

Now, exemplary embodiments of the present invention are described in detail referring to the accompanying drawings.

First Embodiment

Figure 1:
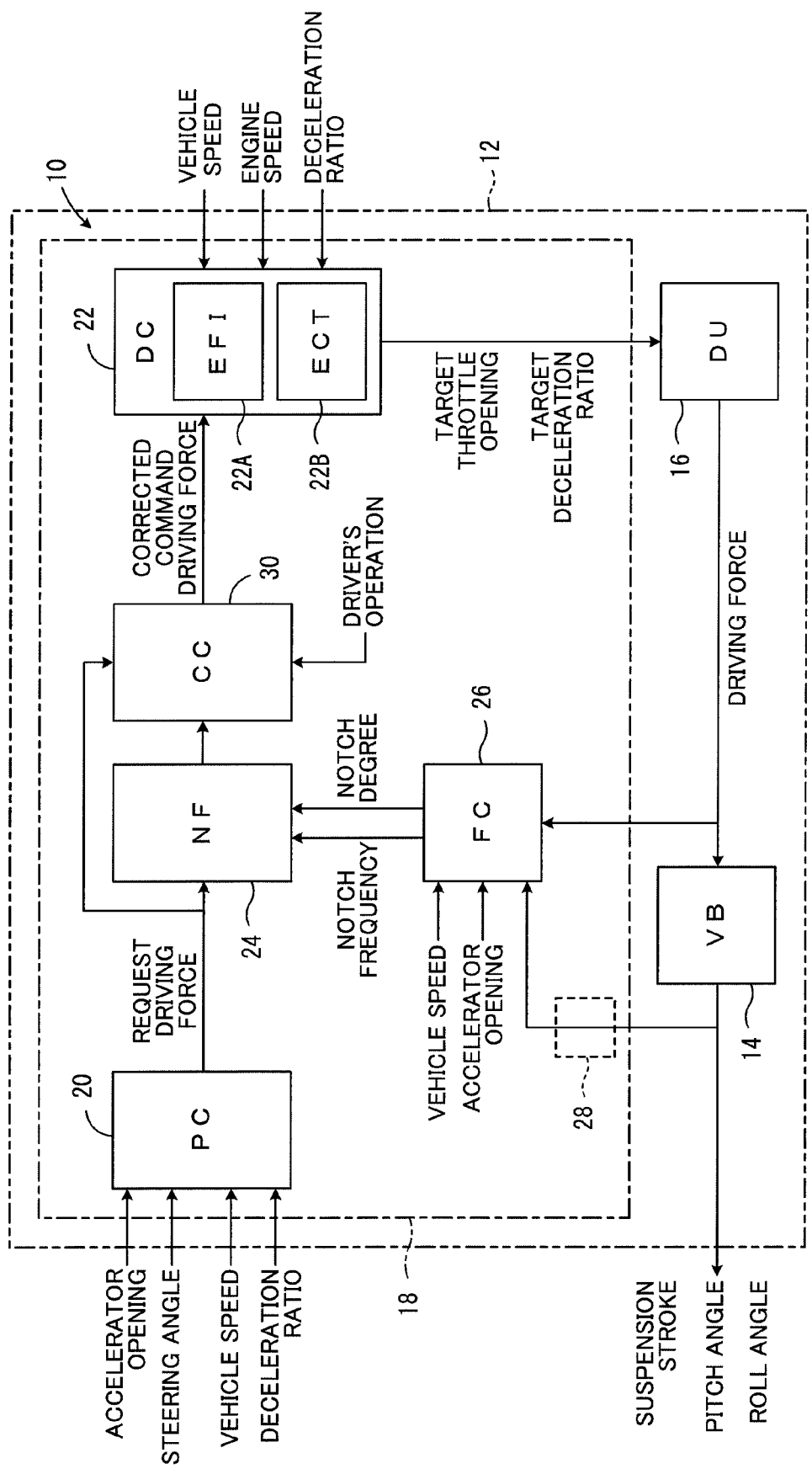
FIG. 1 is a block diagram illustrating a vehicle body vibration control device for a vehicle according to a first embodiment of the present invention, which is applied to a rear-wheel-drive vehicle including a combination of an engine and a transmission as a driving unit.

FIG. 1 is a block diagram illustrating a vehicle body vibration control device 10 for a vehicle according to a first embodiment of the present invention. In FIG. 1, the vehicle body vibration control device 10 is mounted on a vehicle 12, and includes a vehicle body (VB) 14, a driving unit (DU) 16 configured to apply a driving force to the vehicle 12 including the vehicle body 14, and an electronic control unit (ECU) 18 configured to control the driving unit 16. In the illustrated embodiment, the driving unit 16 includes an engine and a transmission (automatic transmission, continuously variable transmission, or dual clutch transmission) in combination. However, the driving unit 16 may be another driving unit such as a hybrid system and an electric motor. The electronic control unit 18 may be an arbitrary electronic control unit having a calculation function and a storage function, for example, as in the case of a microcomputer.

The electronic control unit 18 includes a request driving force calculation block (PC) 20 configured to calculate a driver's request driving force, and a driving force control block (DC) 22 configured to output a signal for controlling a driving force to the driving unit 16. Signals indicating an accelerator opening and a steering angle, which correspond to a driver's steering operation amount, and signals indicating a vehicle speed and a deceleration ratio of the transmission, which correspond to parameters indicating a driving state of the vehicle, are input to the request driving force calculation block 20. The request driving force calculation block 20 calculates a driver's request driving force based on the accelerator opening, the steering angle, the vehicle speed, and the deceleration ratio, or another arbitrary driving force calculation input parameter in addition to those parameters.

A signal indicating the driver's request driving force is input to a notch filter (NF) 24. The notch filter 24 suppresses or blocks transmission of a notch frequency component among frequency components included in the signal indicating the request driving force to reduce the notch frequency component. In this case, the notch frequency is basically set to a resonance frequency of the vehicle body. The signal indicating the request driving force (command driving force) corrected through processing of the notch filter 24 is input through a command driving force correction block (CC) 30 to the driving force control block 22. The command driving force correction block 30 is described later in detail referring to FIG. 2.

Pitch damping of the vehicle body through the notch filter 24 is filter processing represented by a transfer function H(s) in Expression (1), where $\zeta_p$ denotes a pitch damping ratio, $\zeta_m$ denotes a sum of the pitch damping ratio $\zeta_p$ and a control damping ratio $\zeta_k$, $\omega_p$ denotes a pitch natural frequency, and s denotes a Laplace operator.

$$H(s) = \frac{s^2 + 2\zeta_p \omega_p s + \omega_p^2}{s^2 + 2\zeta_m \omega_p s + \omega_p^2} \quad (1)$$

The filter processing represented by the transfer function in Expression (1) is represented by Expression (2) in terms of discrete-time expression, where $y_n$ and $x_n$ respectively denote an output value and an input value, $x_{n-1}$ and $x_{n-2}$ respectively denote a last input value and an input value before the last input value, and $y_{n-1}$ and $y_{n-2}$ respectively denote a last output value and an output value before the last output value.

$$y_n = a_n x_n + a_{n-1} x_{n-1} + a_{n-2} x_{n-2} - b_{n-1} y_{n-1} - b_{n-2} y_{n-2} \quad (2)$$

The filter coefficients $a_n$, $a_{n-1}$, $a_{n-2}$, $b_{n-1}$, and $b_{n-2}$ in Expression (2) are represented as follows.

$$a_n = \frac{\omega_p^2 T^2 + 4\zeta_p \omega_p T + 4}{c}$$

$$a_{n-1} = \frac{2\omega_p^2 T^2 - 8}{c}$$

$$a_{n-2} = \frac{\omega_p^2 T^2 - 4\zeta_p \omega_p T + 4}{c}$$

$$b_{n-1} = \frac{2\omega_p^2 T^2 - 8}{c} = a_{n-1}$$

$$b_{n-2} = \frac{\omega_p^2 T^2 - 4\zeta_m \omega_p T + 4}{c}$$

$$c = \omega_p^2 T^2 + 4\zeta_m \omega_p T + 4$$

The driving force control block 22 includes an electronic fuel injection (EFI) system control unit 22A and an electronic control transmission (ECT) control unit 22B. The driving force control block 22 determines a target throttle opening degree and a target deceleration ratio based on the parameters of the command driving force, the vehicle speed, an engine revolution number, and a deceleration ratio, and the driving force control block 22 outputs signals indicating those target throttle opening and target deceleration ratio to the driving unit 16.

The engine is controlled based on the target throttle opening, and the transmission is controlled based on the target deceleration ratio. Accordingly, the driving unit 16 applies a driving force corresponding to the command driving force to the vehicle 12 including the vehicle body 14. When the driving force is applied to the vehicle 12 and fluctuates, the vehicle body 14 of the vehicle vibrates. In particular, vibration such as pitching vibration or rolling vibration of the vehicle body appears as a change in suspension stroke, pitch angle, or roll angle.

A signal indicating the driving force applied to the vehicle 12 by the driving unit 16, and a signal indicating the change in suspension stroke, pitch angle, or roll angle, which occurs in the vehicle body due to the driving force, are input to a notch filter control block (FC) 26. The notch filter control block 26 variably controls a notch frequency of the notch filter 24. Specifically, the notch filter control block 26 calculates an amplitude distribution of pitching vibration or rolling vibration of the vehicle body with respect to a frequency of the command driving force on the basis of the correspondence between the frequency of the command driving force and vibration of the vehicle body 14, in particular, the pitching vibration or the rolling vibration of the vehicle body. Then, the notch filter control block 26 controls the notch frequency so as to minimize amplitude of the pitching vibration or the rolling vibration of the vehicle body.

For example, the notch filter control block 26 performs frequency analysis by a Fourier transform method for response motion of the vehicle body to a driving force applied to the vehicle in various driving states of the vehicle. Then, the notch filter control block 26 calculates an amplitude distribution of the pitching vibration or the rolling vibration of the vehicle body with respect to the frequency of the command driving force, and controls the notch frequency so as to minimize the amplitude thereof.

In this case, a signal indicating the pitching or the rolling of the vehicle body, which is input to the notch filter control block 26, may be subjected to low-pass filter processing by a low-pass filter as indicated by a broken-line block 28 of FIG. 1. Through the low-pass filter processing, vehicle body vibration of a relatively low frequency of about 1 Hz to 2 Hz, which is easily generated by resonance along with a change in driving operation amount such as the accelerator opening or the steering angle, is efficiently extracted. As a result, the notch frequency can be more accurately controlled.

The control itself of the notch frequency of the notch filter 24 is not a main subject of the present invention. Accordingly, the notch frequency may be calculated through an arbitrary procedure as long as the notch frequency is calculated to a value, for example, corresponding to a resonance frequency of the vehicle body so as to effectively reduce the pitching vibration or the rolling vibration of the vehicle body. For example, as another control procedure, a procedure described in paragraphs [0036] to [0038] of Japanese Patent Application Laid-open No. 2007-237879 filed by the applicant of this application may be used.

The notch filter 24 has its notch frequency controlled by the notch filter control block 26, and a notch degree of the notch filter 24, in other words, an attenuation degree of a component of the notch frequency is controlled depending on increase or decrease of the driver's request driving force, therefore, depending on whether the driver's request is acceleration or deceleration. Notably, the increase or decrease of the driver's request driving force may be determined based on increase or decrease of the accelerator opening. The control of the notch degree based on whether the driver's request is acceleration or deceleration is not a main subject of the present invention. Thus, the notch degree may be calculated through an arbitrary procedure, or set to a fixed value.

Figure 3:
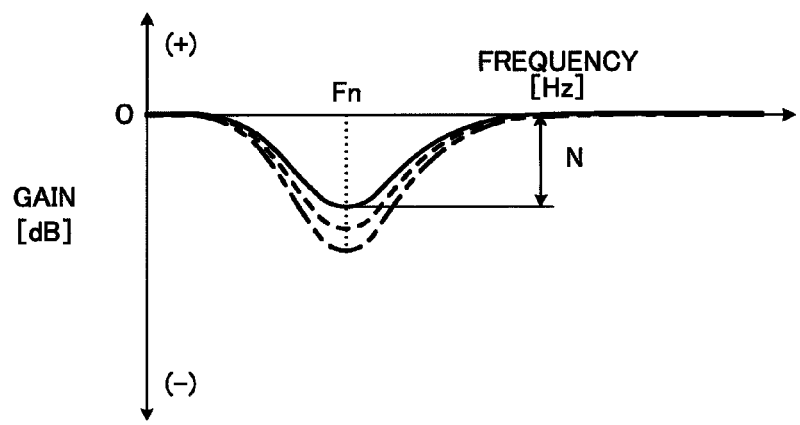
FIG. 3 is a graph showing an example of frequency characteristics of the notch filter, that is, a relationship between a frequency and a gain.

FIG. 3 shows frequency characteristics of the notch filter 24, in which Fn denotes a notch frequency. As can be understood from FIG. 3, a notch degree N indicates a depth of a V-shaped notch in the frequency characteristics. As the notch degree is higher, an attenuation degree of a driver's request driving force in the notch frequency is higher.

Figure 2:
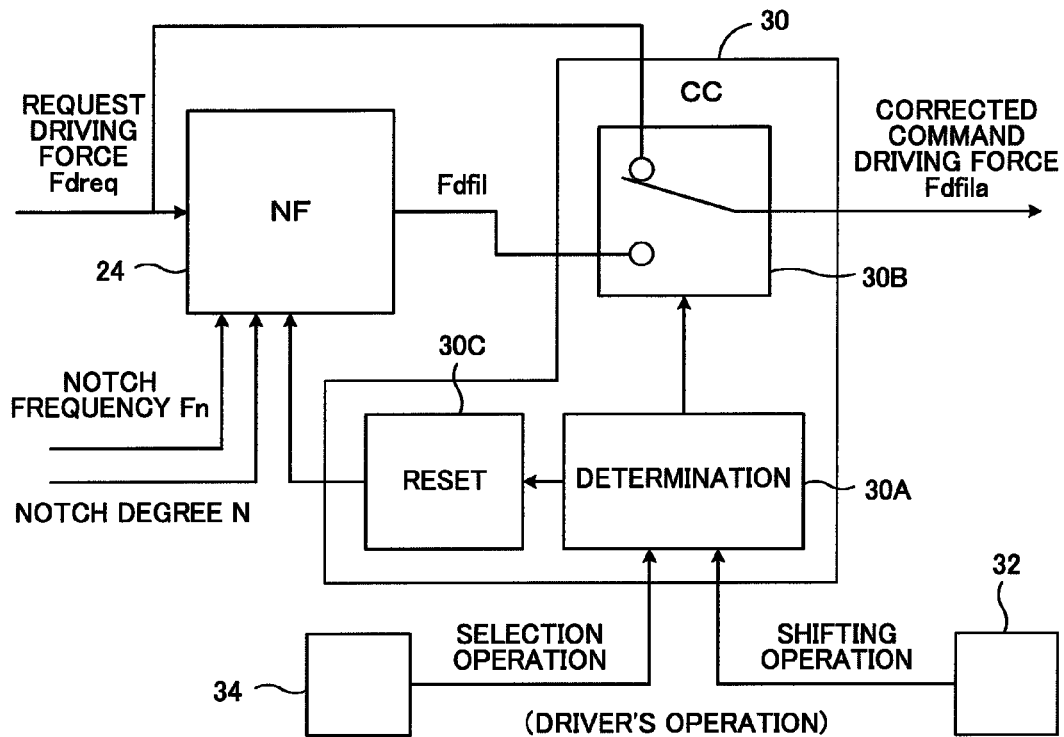
FIG. 2 is a block diagram illustrating a notch filter and a command driving force correction block according to the first embodiment.

As illustrated in FIG. 2, the command driving force correction block 30 includes a determination block 30A, a switching block 30B, and a reset block 30C. A signal indicating a driver's shifting operation (shift position and its change) is input to the determination block 30A from a shift position sensor 32, and a signal indicating a driver's traveling mode selecting operation (vehicle traveling mode and its change) is input to the determination block 30A from a traveling mode selection switch 34.

The shift position may be a neutral position or a parking position where the vehicle driving force does not change even when the driver performs a driving operation to increase or decrease the accelerator opening, or a drive position or the like where the vehicle driving force changes when the driver performs the driving operation. The vehicle traveling mode may be a normal mode in which responsiveness of the driving force is set to normal responsiveness, a power mode in which the responsiveness of the driving force is set to high responsiveness, an eco-mode in which the responsiveness of the driving force is set to moderate responsiveness, and the like.

The determination block 30A determines whether or not the shift position has changed between the shift position where the vehicle driving force does not change and the shift position where the vehicle driving force may change based on information about the driver's shifting operation. The determination block 30A determines whether or not the traveling mode has changed based on information about the driver's traveling mode selecting operation. When the determination block 30A determines that the shift position or the traveling mode has changed, the block 30A determines that correction of the command driving force needs to be stopped, and outputs, to the switching block 30B, a command to set a corrected command driving force Fdfila to a request driving force Fdreq.

When the switching block 30B has not received, from the determination block 30A, any command to set the corrected command driving force Fdfila to the request driving force Fdreq, the switching block 30B outputs a command driving force Fdfil to the driving force control block 22 as the corrected command driving force Fdfila. On the other hand, when the switching block 30B has received, from the determination block 30A, the command to set the corrected command driving force Fdfila to the request driving force Fdreq, the switching block 30B outputs the request driving force Fdreq to the driving force control block 22 as the corrected command driving force Fdfila.

In a situation where the correction of the command driving force is stopped, when a condition for ending the stop of the correction of the command driving force is satisfied, the determination block 30A outputs a command to reset the notch filter 24 to the reset block 30C. After the reception of the reset command, as described later in detail, the reset block 30C resets the notch filter to set a state enabling the notch filter 24 to perform filter processing without any influence of past data.

As apparent from the above description, the request driving force calculation block 20, the driving force control block 22, and the command driving force correction block 30 respectively function as a request driving force calculation unit, a driving force control unit, and a command driving force correction unit of the present invention. The functions of those blocks and the notch filter 24 are achieved under control of the electronic control unit 18. For example, each function is achieved by a calculation control unit such as a microcomputer constructing the electronic control unit 18 in accordance with a control program.

Figure 4:
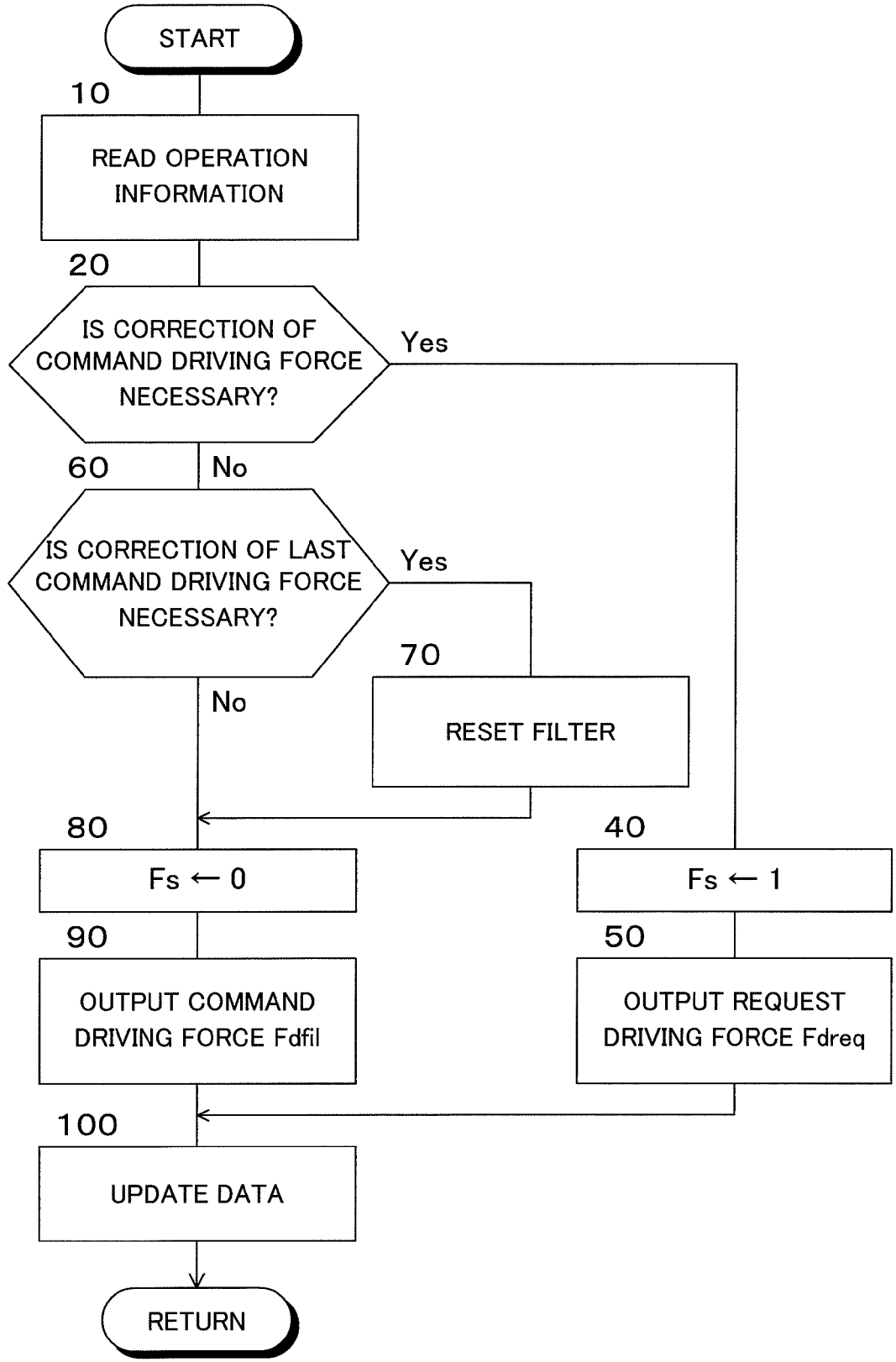
FIG. 4 is a flowchart illustrating an example of a command driving force correction and notch filter resetting routine according to the first embodiment.

FIG. 4 is a flowchart illustrating an example of a command driving force correction and notch filter resetting routine executed by the command driving force correction block 30. Control executed in accordance with the flowchart illustrated in FIG. 4 is started by turning ON an ignition switch (not shown), and is repeatedly executed at each predetermined time interval. In the description of the flowchart illustrated in FIG. 4, the control processing executed in accordance with the flowchart is simply referred to as control.

In Step 10, information regarding a driver's shifting operation and a traveling mode selecting operation is read. Prior to Step 10, a flag Fs regarding whether or not correction of the command driving force needs to be canceled is reset to 0.

In Step 20, determination is made as to whether or not correction of the command driving force is necessary. When the determination is negative (No), the control processing proceeds to Step 60. When the determination is positive (Yes), the control processing proceeds to Step 40.

The correction of the command driving force may be determined to be necessary in any of the following cases.
(A) A shift position has changed between a position where no driving force is applied to the vehicle and a position where a driving force is applied to the vehicle.
(B) A traveling mode of the vehicle has changed.
(C) A shift position is a parking position (P) or a neutral position (N).

In Step 40, the flag Fs is set to 1. Then, in Step 50, as the corrected command driving force Fdfila, a signal indicating the request driving force Fdreq is output to the driving force control block 22. Thus, damping of the vehicle body is not carried out.

In Step 60, determination is made as to whether or not the determination in previous Step 20 is a determination in which the command driving force needs to be corrected. When the determination is negative (No), the control processing proceeds to Step 80. When the determination is positive (Yes), the control processing proceeds to Step 70.

In Step 70, the notch filter 24 is reset. In this case, the resetting is achieved by resetting data subjected to filter processing, that is, by rewriting the input values $x_{n-1}$ and $x_{n-2}$ and the output values $y_{n-1}$ and $y_{n-2}$ in Expression (2) to $x_n$ and $y_n$, respectively.

In Step 80, the flag Fs is reset to 0. Then, in Step 90, as the corrected command driving force Fdfila, the command driving force Fdfil, that is, a signal indicating a value generated through the filter processing of the request driving force Fdreq, is output to the driving force control block 22. Thus, damping of the vehicle body is carried out.

After completion of Step 50 or 90, the control proceeds to Step 100, and the data subjected to the filter processing is updated to prepare for next control. In other words, the input values $x_n$ and $x_{n-1}$ in Expression (2) are respectively rewritten to $x_{n-1}$ and $x_{n-2}$.

Next, various cases of correction of the command driving force and resetting of the notch filter according to the embodiment thus configured as described above are described.

<Correction of Command Driving Force is Unnecessary Last Time and this Time>

In this case, negative determination (No) is made in Steps 20 and 60. Accordingly, in Step 90, a signal indicating a command driving force Fdfil is output as a corrected command driving force Fdfila to the driving force control block 22. In this case, the command driving force Fdfil is not affected by a past value, and thus the filter is not reset.

<Correction of Command Driving Force is Necessary this Time>

In this case, positive determination (Yes) is made in Step 20. Accordingly, in Step 50, a signal indicating a request driving force Fdreq is output as a corrected command driving force Fdfila to the driving force control block 22. The driving force of the vehicle is not affected by the filter processing of the notch filter 24. Thus, it is not necessary to reset the filter, and the responsiveness of the driving force of the vehicle is not reduced by the filter processing.

<Correction of Command Driving Force is Unnecessary this Time but Necessary Last Time>

In this case, negative determination (No) is made in Step 20 while positive determination (Yes) is made in Step 60. Accordingly, in Step 70, the notch filter 24 is reset. In Step 90, a signal indicating a command driving force Fdfil is output as a corrected command driving force Fdfila to the driving force control block 22.

Figure 5:
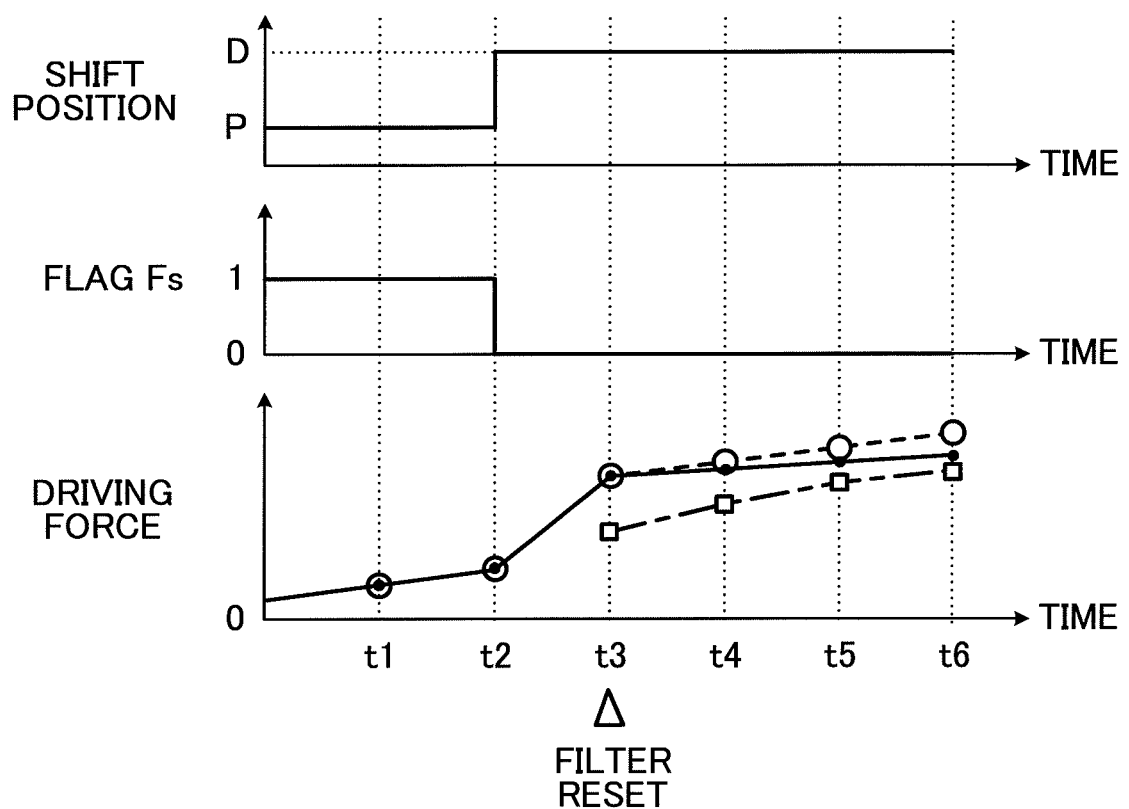
FIG. 5 is a time chart illustrating an operation of the first embodiment in comparison to an operation of the related-art vehicle body vibration control device when a shift position is switched from a parking position to a drive position.

For example, FIG. 5 is a time chart illustrating an operation of the first embodiment of the present invention when the shift position is switched from the parking position to the drive position as compared to an operation of a related-art vehicle body vibration control device. In FIG. 5, the black dot indicates the driver's request driving force Fdreq, and the solid line indicates a change of the request driving force Fdreq. The white circle indicates the corrected command driving force Fdfila in the embodiment of the present invention, and the broken line indicates a change of the corrected command driving force Fdfila. The square indicates the command driving force Fdfil, and the alternate long and short dashed line indicates a change of the command driving force Fdfil.

As illustrated in FIG. 5, it is supposed that the driver's request driving force Fdreq increases little by little at time points t1 and t2, and a shifting operation is executed from parking (P) to drive (D) and the request driving force Fdreq steeply increases at a time point t3. It is further supposed that after the time point t3, the request driving force Fdreq increases little by little.

The command driving force Fdfil at the time point t3 is calculated based on the request driving forces Fdreq and the command driving forces Fdfil at the time points t1 and t2, and thus calculated to a value smaller than the request driving force Fdreq at the time point t3. Similarly, the command driving force Fdfil at a time point t4 is calculated based on the request driving forces Fdreq and the command driving forces Fdfil at the time points t2 and t3, and thus calculated to a value smaller than the request driving force Fdreq at the time point t4. The command driving force Fdfil at a time point t5 and thereafter is similarly calculated based on a past request driving force Fdreq and a past command driving force Fdfil, and thus calculated to a value smaller than the request driving forces Fdreq at a time point of the calculation.

Thus, in the case of the related-art vehicle body vibration control device in which the notch filter 24 is not reset even if the shifting operation is executed and hence the command driving force Fdfil is not corrected, the driving force of the vehicle increases only gradually even when the request driving force Fdreq steeply increases. As a result, the driver feels uncomfortable due to low responsiveness of the driving force to the driver's driving operation, and the uncomfortable feeling is more conspicuous as a steep increase degree of the request driving force Fdreq becomes larger.

On the contrary, according to the first embodiment, the command driving force Fdfil at the time point t3 is not affected by the request driving forces Fdreq and the command driving forces Fdfil at the time points t1 and t2, but calculated based on the request driving force Fdreq at the time point t3. Thus, the command driving force Fdfil is calculated to a value equal to that of the request driving force Fdreq at the time point t3. The command driving force Fdfil at the time point t4 is calculated based on the request driving force Fdreq and the command driving force Fdfil at the time point t3 and the request driving force Fdreq at the time point t4. Thus, the command driving force Fdfil is calculated to a value not affected by the request driving force Fdreq or the like at the time point t2. A command driving force at the time point t5 and thereafter is calculated normally. As a result, the driver can be prevented from feeling uncomfortable due to low responsiveness of the driving force to the driver's driving operation.

FIG. 5 illustrates the exemplary case where the shift position is switched from the parking position to the drive position. However, for example, even when the shift position is switched from the drive position to a neutral position or when the shift position is switched from the drive position to the parking position, similar actions and effects can be provided. In other words, even when an arbitrary shifting operation is performed between the shift position where the driving force is applied to the vehicle and the shift position where no driving force is applied to the vehicle, similar actions and effects can be provided.

Moreover, even when a changing operation for the vehicle traveling mode, which involves a change of the responsiveness of the driving force of the vehicle to the driver's driving operation, is performed or when the request driving force Fdreq steeply decreases, similar actions and effects can be provided.

Second Embodiment

Figure 6:
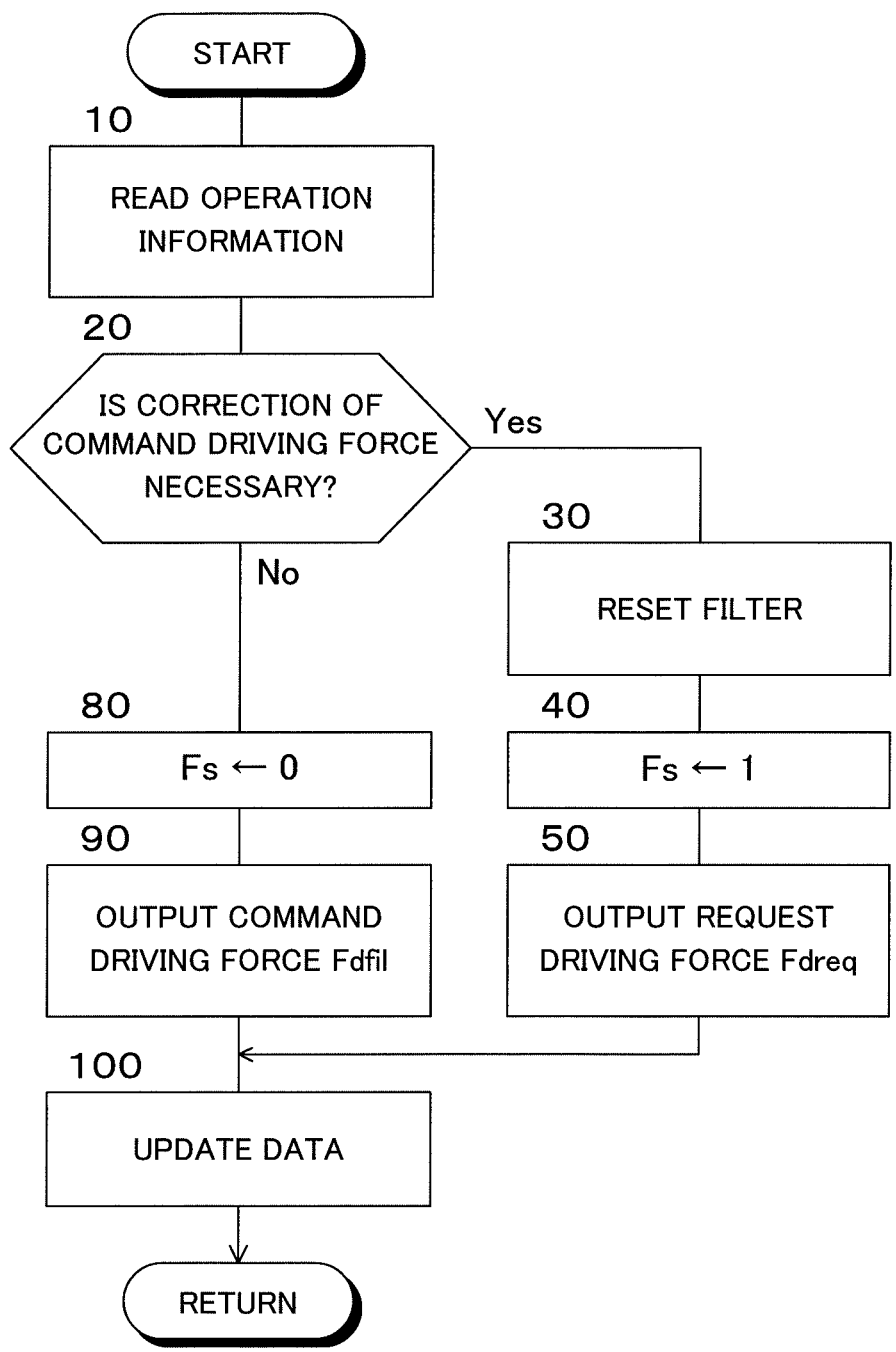
FIG. 6 is a flowchart illustrating an example of a command driving force correction and notch filter resetting routine according to a second embodiment of the present invention.

FIG. 6 is a flowchart illustrating an example of a command driving force correction and notch filter resetting routine executed in a command driving force correction block 30 of a vehicle body vibration control device 10 for a vehicle according to a second embodiment of the present invention. In FIG. 6, steps similar to those in FIG. 4 are denoted by the same step numbers as in FIG. 4.

According to the second embodiment, when negative determination (No) is made in Step 20, without executing determination in Step 60 of the first embodiment, the control processing proceeds to Step 80. When positive determination (Yes) is made in Step 20, in Step 30, the notch filter 24 is reset as in Step 70 of the first embodiment, and then the control processing proceeds to Step 40. Other steps in the second embodiment are executed similarly to those of the first embodiment.

Figure 7:
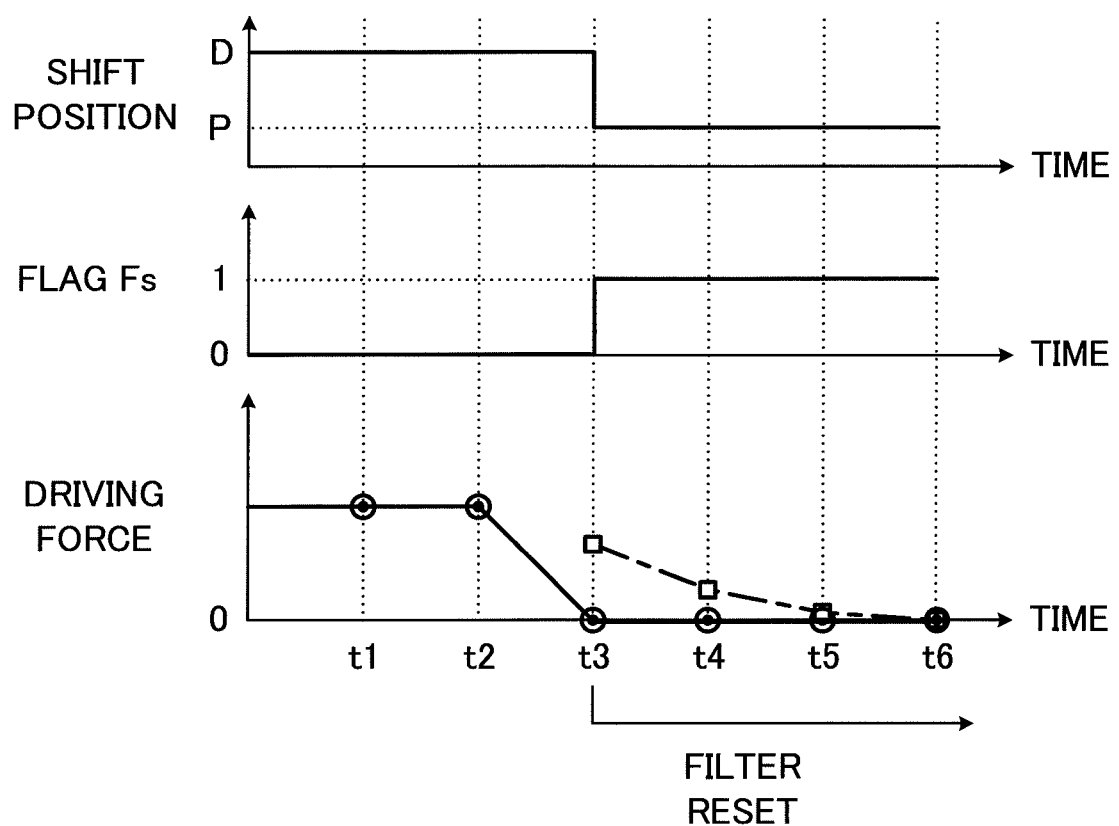
FIG. 7 is a time chart illustrating an operation of the second embodiment in comparison to an operation of the related-art vehicle body vibration control device when a shift position is switched from a drive position to a parking position.

Similarly to FIG. 5, FIG. 7 is a time chart illustrating an operation of the second embodiment of the present invention when the shift position is switched from the drive position to the parking position as compared to an operation of the related-art vehicle body vibration control device.

As illustrated in FIG. 7, it is supposed that at a time point t3, a shift position is switched from a drive position to a parking position, thereby changing a flag Fs from 0 to 1. It is further supposed that a request driving force Fdreq is maintained constant until a time point t2, the request driving force Fdreq is steeply reduced to 0 at the time point t3, and the request driving force Fdreq is maintained at 0 at a time point t4 and thereafter.

The command driving force Fdfil at the time point t3 is calculated based on the request driving forces Fdreq and the command driving forces Fdfil at time points t1 and t2, and thus calculated to a value larger than the request driving force Fdreq at the time point t3. Similarly, the command driving force Fdfil at the time point t4 is calculated based on the request driving forces Fdreq and the command driving forces Fdfil at the time points t2 and t3, and thus calculated to a value larger than the request driving force Fdreq at the time point t4. The command driving force Fdfil at a time point t5 and thereafter is similarly calculated based on a past request driving force Fdreq and a past command driving force Fdfil, and thus calculated to a value larger than the request driving force Fdreq at a time point of the calculation.

Thus, in the case of the related-art vehicle body vibration control device in which the notch filter 24 is not reset even if the shifting operation is executed and hence the command driving force Fdfil is not corrected, the driving force of the vehicle decreases only gradually even when the request driving force Fdreq steeply decreases. As a result, the driver feels uncomfortable due to low responsiveness of the driving force to the driver's driving operation, and the uncomfortable feeling is more conspicuous as a steep decrease degree of the request driving force Fdreq becomes larger.

On the contrary, according to the second embodiment, the flag Fs is 1 at the time point t3 and thereafter, and the notch filter 24 is reset each time. At the time point t3 and thereafter, the command driving force Fdfil is calculated to a value not affected at all by past request driving forces Fdreq or command driving forces Fdfil. As a result, as in the case of the first embodiment, the driver can be prevented from feeling uncomfortable due to low responsiveness of the driving force to the driver's driving operation.

FIG. 7 illustrates the exemplary case where the shift position is switched from the drive position to the parking position. However, even when the shift position is switched from the drive position to a neutral position, similar actions and effects can be provided. In other words, when the flag Fs is switched from 0 to 1 by the driver's operation, similar actions and effects can be provided.

In particular, in the first and second embodiments of the present invention, in Step 50, the signal indicating the request driving force Fdreq is output to the driving force control block 22 as the corrected command driving force Fdfila. Thus, the driving force of the vehicle is not affected by the filter processing of the notch filter 24. As a result, as compared to where a value closer to the request driving force Fdreq than to the command driving force Fdfil but larger than the request driving force Fdreq is set as the corrected command driving force Fdfila, the risk of experience of the driver's uncomfortable feeling due to the reduction of the responsiveness of the driving unit 16 can be reduced more effectively.

As a notch degree of the notch filter 24 becomes lower, a smoothing degree of the driver's request driving force through the filter processing becomes lower. Accordingly, in Step 50, the notch degree may be reduced to a value smaller than that at normal time (including 0), and then the notch filter processing may be performed. Similarly, in this case, similar actions and effects to those of the first and second embodiments can be provided.

The specific embodiments of the present invention are described in detail above. However, the present invention is not limited to the above-mentioned embodiments. It is apparent for those skilled in the art that various other embodiments may be employed within the scope of the present invention.

For example, according to the above-mentioned embodiments, when it is determined that there is a need to correct the command driving force to a value reduced in effect of the filter processing, the corrected command driving force Fdfila is set to the driver's request driving force Fdreq. However, the corrected command driving force Fdfila may be set to a value other than the request driving force as long as the value is closer to the driver's request driving force than to the command driving force. For example, as the value other than the request driving force, there may be used a simple average value or a weighted average value of the command driving force Fdfil and the request driving force Fdreq, or a sum of Ka(Fdfil−Fdreq)+Fdreq, which is obtained by adding the request driving force to a value obtained by multiplying a difference between the command driving force Fdfil and the request driving force Fdreq by a coefficient Ka larger than 0 and smaller than 1.

According to the above-mentioned embodiments, in the cases (A) to (C), it is determined that there is a need to correct the command driving force to the value reduced in effect of the filter processing. However, in the case of a vehicle including a manual transmission, it may be determined that there is a need to correct the command driving force to the value reduced in effect of the filter processing when a clutch is engaged. Further, in the case of a vehicle where brake override system (BOS) control, drive start control (DSC), and automatic speed limiter (ASL) control are executed, it may be determined that there is a need to correct the command driving force during execution of such control.

In the above-mentioned first and second embodiments, the command driving force correction block 30 operates between the notch filter 24 and the driving force control block 22 to switch the corrected command driving force Fdfila to the command driving force Fdfil or the request driving force Fdreq. However, the command driving force correction block 30 may operate on a side opposite to the driving force control block 22 with respect to the notch filter 24 to switch inputting of the request driving force Fdreq to the notch filter 24 and to the driving force control bock 22 (a modified example).

According to the first and second embodiments of the present invention, the notch filter 24 can continue calculation of the filter processing irrespective of switching of the command driving force correction block 30. Thus, the responsiveness of the driving force of the vehicle when the request driving force Fdreq increases or decreases can be set higher than in a case of the modified example.

Figure 8:
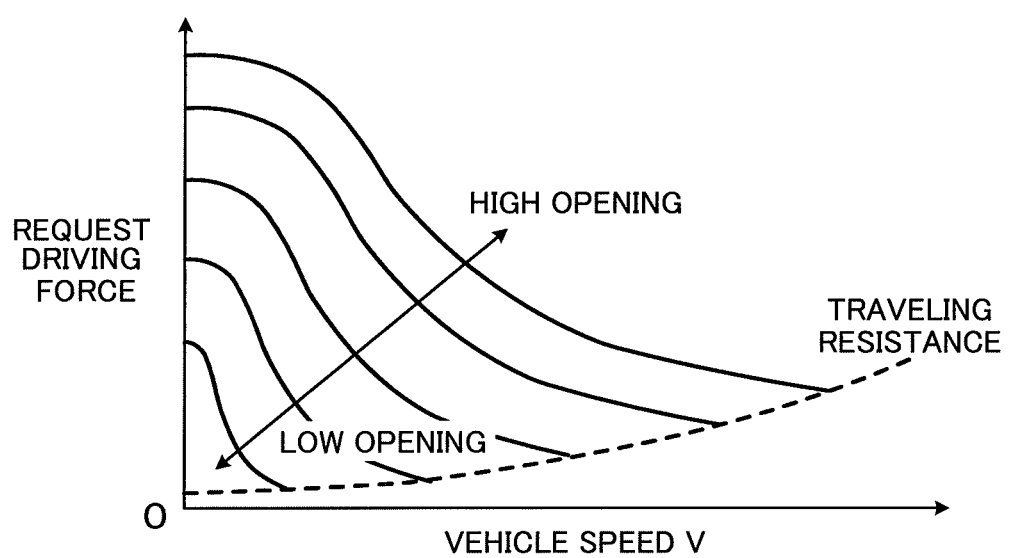
FIG. 8 is a map for calculating a driver's request driving force based on a vehicle speed and an accelerator opening.

In the above-mentioned embodiments, the driver's request driving force is estimated based on the accelerator opening. However, correction may be performed in such a manner that the driver's request driving force is calculated from a map illustrated in FIG. 8 based on the vehicle speed and the accelerator opening. In FIG. 8, a high opening and a low opening respectively mean a large accelerator opening and a small accelerator opening.

In the above-mentioned embodiments, the driving unit 16 includes the engine and the transmission in combination, and signals indicating a target throttle opening and a target deceleration ratio calculated based on the command driving force or the like are output to the driving unit 16. However, when the vehicle body vibration control device of the present invention is applied to a vehicle having a hybrid system mounted thereon, outputs of an engine and an electric motor may be controlled based on the command driving force or the like. When the vehicle body vibration control device of the present invention is applied to an electric vehicle, an output of an electric motor may be controlled based on the command driving force or the like.

In particular, when the vehicle body vibration control device of the present invention is applied to the vehicle having a hybrid system mounted thereon or to the electric vehicle, torque of the electric motor is lowered along with increase of the revolution speed thereof, and thus the notch degree may be set lower as the vehicle speed is higher.

In the above-mentioned embodiments, the vehicle is the rear-wheel-drive vehicle. However, the vehicle body vibration control device of the present invention may be applied to a front-wheel-drive vehicle and a four-wheel-drive vehicle.

What is claimed is:

1. A vehicle body vibration control device for a vehicle, comprising:
   a request driving force calculation unit configured to calculate a request driving force of a driver;
   a driving unit configured to apply a driving force to the vehicle;
   a driving force control unit configured to control said driving unit based on a command driving force; and
   a notch filter configured to receive a signal indicating the request driving force from said request driving force calculation unit, subject the signal to filter processing, and to output the signal, which has been subjected to the filter processing, to said driving force control unit as a signal indicating the command driving force, the notch filter having a notch frequency set to a value for reducing a frequency component of vibration of a vehicle body,
   wherein said notch filter calculates the command driving force at every predetermined time interval based on a past request driving force, a current request driving force, and a past command driving force,
   wherein said vehicle body vibration control device further comprises a determination unit configured to determine whether or not there is a need to correct the command driving force to a value reduced in effect of said filter processing, and a command driving force correction unit configured to correct, when said determination unit determines that there is a need to correct the command driving force, the command driving force to the value reduced in effect of said filter processing, and
   wherein said command driving force correction unit corrects, when said determination unit determines that there is no more need to correct the command driving force, in calculation of a command driving force executed immediately after the determination, said notch filter so as to calculate the command driving force by using the current request driving force in place of the past request driving force and the past command driving force.

2. A vehicle body vibration control device for a vehicle, comprising:
a request driving force calculation unit configured to calculate a request driving force of a driver;
a driving unit configured to apply a driving force to the vehicle;
a driving force control unit configured to control said driving unit based on a command driving force; and
a notch filter configured to receive a signal indicating the request driving force from said request driving force calculation unit, subject the signal to filter processing, and to output the signal which has been subjected to the filter processing, to said driving force control unit as a signal indicating the command driving force, said notch filter having a notch frequency set to a value for reducing a frequency component of vibration of a vehicle body,
wherein said notch filter calculates the command driving force at every predetermined time interval based on a past request driving force, a current request driving force, and a past command driving force,
wherein said vehicle body vibration control device further comprises a determination unit configured to determine whether or not there is a need to correct the command driving force to a value reduced in effect of the filter processing, and a command driving force correction unit configured to correct, when said determination unit determines that there is a need to correct the command driving force, the command driving force to the value reduced in effect of said filter processing, and
wherein said command driving force correction unit corrects, when said determination unit determines that there is a need to correct the command driving force, said notch filter so as to calculate the command driving force by using the current request driving force in place of the past request driving force and the past command driving force.

3. A vehicle body vibration control device for a vehicle according to claim 1, wherein said determination unit determines, when the driving force applied to the vehicle changes in stages during the correction of the command driving force, that there is no more need to correct the command driving force.

4. A vehicle body vibration control device for a vehicle according to claim 2, wherein said determination unit determines, under a state in which the correction of the command driving force is not executed, that there is a need to correct the command driving force in any one of cases in which said driving unit applies no driving force to the vehicle and in which driving force limitation control for limiting the driving force applied to the vehicle is executed even when the driver performs an operation to increase the driving force.

* * * * *